(12) United States Patent
Pingston et al.

(10) Patent No.: US 10,000,171 B2
(45) Date of Patent: Jun. 19, 2018

(54) VEHICLE ENERGY-ABSORBING DEVICE

(71) Applicant: Ford Global Technologies, LLC, Dearborn, MI (US)

(72) Inventors: Stephen Noel Pingston, Royal Oak, MI (US); Sudip Sankar Bhattacharjee, Novi, MI (US); Mohammed Shenaq, Dearborn, MI (US); Ray Hari Manala Rethinam, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/375,627

(22) Filed: Dec. 12, 2016

(65) Prior Publication Data
US 2017/0355332 A1 Dec. 14, 2017

Related U.S. Application Data

(60) Provisional application No. 62/348,550, filed on Jun. 10, 2016.

(51) Int. Cl.
*B60R 19/18* (2006.01)
*B60R 19/44* (2006.01)

(52) U.S. Cl.
CPC .............. *B60R 19/44* (2013.01); *B60R 19/18* (2013.01); *B60R 2019/1846* (2013.01); *B60R 2019/1893* (2013.01)

(58) Field of Classification Search
CPC ............ B60R 19/44; B60R 2019/1846; B60R 2019/186; B60R 2019/1866; B60R 2019/1893; B60R 19/18

USPC ....... 296/187.03, 187.09; 293/102, 120, 121, 293/132, 133; 188/371, 377
See application file for complete search history.

(56) References Cited

U.S. PATENT DOCUMENTS

| | | | |
|---|---|---|---|
| 3,806,180 A | | 4/1974 | Patterson |
| 3,938,841 A | * | 2/1976 | Glance .................... B60R 19/18 267/116 |
| 4,221,413 A | * | 9/1980 | Bonnetain ............... B60R 19/18 188/377 |
| 5,031,947 A | | 7/1991 | Chen |

(Continued)

FOREIGN PATENT DOCUMENTS

| | | |
|---|---|---|
| CN | 105365716 A | 3/2016 |
| DE | 2850723 A1 | 5/1979 |

(Continued)

OTHER PUBLICATIONS

UKIPO Search Report for Application No. GB1708948.3 dated Oct. 27, 2017 (4 pages).

(Continued)

*Primary Examiner* — Gregory A Blankenship
(74) *Attorney, Agent, or Firm* — Frank A. MacKenzie; Bejin Bieneman PLC (57) ABSTRACT

An energy-absorbing device includes a beam having a longitudinal axis and a plurality of lobes attached to and positioned sequentially along the beam. The lobes are spaced from each other, deformable relative to the beam, and configured to contact adjacent lobes when deformed. The size and spacing of the lobes is such that if a single lobe is deformed, the lobe will not contact adjacent lobes, but if adjacent lobes are deformed, the lobes will contact each other.

19 Claims, 7 Drawing Sheets

(56) References Cited

U.S. PATENT DOCUMENTS

| | | | |
|---|---|---|---|
| 6,315,339 B1* | 11/2001 | Devilliers | B60R 19/18 293/120 |
| 6,443,513 B1* | 9/2002 | Glance | B32B 3/12 293/102 |
| 7,159,911 B2 | 1/2007 | Nguyen et al. | |
| 7,163,242 B2* | 1/2007 | Shuler | B60R 19/18 293/120 |
| 7,806,448 B2* | 10/2010 | Allen | B60R 19/18 293/120 |
| 8,104,804 B2 | 1/2012 | Mani | |
| 9,233,657 B1 | 1/2016 | Phadatare et al. | |
| 9,731,669 B2* | 8/2017 | Nagwanshi | B60R 19/18 |
| 2003/0164618 A1 | 9/2003 | Gentle | |
| 2003/0189343 A1* | 10/2003 | Evans | B60R 19/18 293/120 |
| 2005/0057053 A1* | 3/2005 | Evans | B60R 19/18 293/133 |
| 2005/0200062 A1 | 9/2005 | Maurer et al. | |
| 2006/0022472 A1 | 2/2006 | Omura | |
| 2006/0028038 A1* | 2/2006 | Glasgow | B60N 2/4235 293/132 |
| 2006/0131901 A1* | 6/2006 | Nguyen | B60R 19/18 293/120 |
| 2007/0267261 A1* | 11/2007 | Toccalino | F16F 7/08 188/377 |
| 2007/0278803 A1* | 12/2007 | Jaarda | B60R 19/18 293/120 |
| 2008/0256686 A1* | 10/2008 | Ferrara | A41D 13/0155 2/413 |
| 2009/0026801 A1* | 1/2009 | Murayama | B60R 19/18 296/187.05 |
| 2009/0045637 A1* | 2/2009 | Kusche | B60R 19/18 293/133 |
| 2011/0006554 A1* | 1/2011 | Mani | B60R 19/18 293/132 |
| 2011/0109105 A1* | 5/2011 | Ralston | B60R 19/18 293/132 |
| 2011/0309653 A1* | 12/2011 | Schuler | B60R 19/18 296/187.03 |
| 2012/0104775 A1* | 5/2012 | Marur | B60R 19/18 293/120 |
| 2012/0146347 A1* | 6/2012 | Huang | B60R 19/04 293/132 |
| 2012/0286529 A1* | 11/2012 | Gukkenberger | B60R 19/18 293/132 |
| 2013/0113226 A1 | 5/2013 | Bobba et al. | |
| 2013/0175128 A1* | 7/2013 | Kumar | B60R 19/18 188/377 |
| 2013/0221691 A1* | 8/2013 | Nagwanshi | B60R 19/18 293/132 |
| 2013/0313841 A1* | 11/2013 | Mana | B60R 19/18 293/136 |
| 2014/0312636 A1* | 10/2014 | Corwin | B60R 21/34 293/133 |
| 2017/0088074 A1* | 3/2017 | Borghi | B60R 19/18 |

FOREIGN PATENT DOCUMENTS

| | | |
|---|---|---|
| DE | 19861026 A1 | 6/2000 |
| DE | 102005037152 A1 | 2/2007 |
| DE | 102014212587 A1 | 12/2015 |
| FR | 2734328 A1 | 11/1996 |
| GB | 2195586 A | 4/1988 |
| GB | 2341147 A | 3/2000 |
| JP | 2004237810 A | 8/2004 |
| JP | 2009154672 A | 7/2009 |
| WO | 2006081942 A1 | 8/2006 |

OTHER PUBLICATIONS

Non-Final Office Action dated Oct. 4, 2017 for U.S. Appl. No. 15/442,741 (11 pages).

* cited by examiner

VEHICLE ENERGY-ABSORBING DEVICE

CROSS-REFERENCE TO RELATED APPLICATION

The subject patent application claims priority to and all the benefits of U.S. Provisional Patent Application No. 62/348,550, which was filed on Jun. 10, 2016.

BACKGROUND

Bumpers of vehicles are designed to absorb energy and/or transfer energy during vehicle impacts. Such vehicle impacts may include frontal and rear impacts. Impacts may occur with objects of varying size and mass. For example, a vehicle may impact a relatively large, wide object such as another vehicle or a road barrier. Such impacts may be simulated with crash tests, such as a frontal impact test, a frontal oblique impact test, small offset rigid barrier (SORB) test, etc. Alternatively, the vehicle may impact narrower, lighter objects, such as pedestrians. These impacts may be simulated by pedestrian protection (PedPro) crash tests. Regardless of the size of the object being impacted, another consideration in the design of the bumper is low-speed damageability, which is simulated by crash tests that measure the amount of damage to the exterior of the bumper resulting from low-speed impacts. In these tests, little or no exterior damage to the bumper is desired to reduce the likelihood of costly repairs resulting from low-speed impacts.

These different classes of impacts present competing design factors for the bumper. During an impact with a larger, wider object, it may be more beneficial for the bumper to provide greater stiffness during deformation of the bumper to increase the energy absorbed. In contrast, during an impact with a narrower object that may be a pedestrian, it may be more beneficial to reduce the stiffness of the bumper during deformation, which may reduce injuries to the pedestrian. In further contrast, it may be beneficial for the bumper to be rigid, with no deformation, during low-speed damageability tests to reduce the likelihood of damage to the exterior of the bumper.

DETAILED DESCRIPTION

With reference to the Figures, wherein like numerals indicate like parts throughout the several views, an energy-absorbing device 30 for a bumper assembly 42 of a vehicle 38 includes a beam 32 having a longitudinal axis L and a plurality of lobes 34, 134 attached to and positioned sequentially along the beam 32. The lobes 34, 134 are spaced from each other and deformable relative to the beam 32. Adjacent ones of the lobes 34, 134 are configured to contact each other when both of the adjacent ones of the lobes 34, 134 are deformed.

The energy-absorbing device 30 provides different behavior during impacts with wide objects versus impacts with narrow objects. During an impact with a wide object, the energy-absorbing device 30 provides greater resistance and stiffness relative to impacts with relatively narrow objects. The greater resistance and stiffness may increase the amount of energy absorbed during deformation. During an impact with a narrow object, the energy-absorbing device 30 provides less resistance and a softer impact relative to impacts with relatively wide objects. The reduced resistance and softened impact may reduce the likelihood of injury to pedestrians. In addition, the lobes 34, 134 reinforce a fascia 44 of the bumper assembly 42, as set forth below, to reduce the likelihood of damage to the fascia 44 during a low-speed impact. One embodiment of the energy-absorbing device 30, for example, is shown in FIGS. 1-4C, and another embodiment of the energy-absorbing device 30, for example, is shown in FIGS. 5A-C. Common numerals are used to identify common elements in the embodiments shown in FIGS. 1-4C and FIGS. 5A-C.

Figure 1:
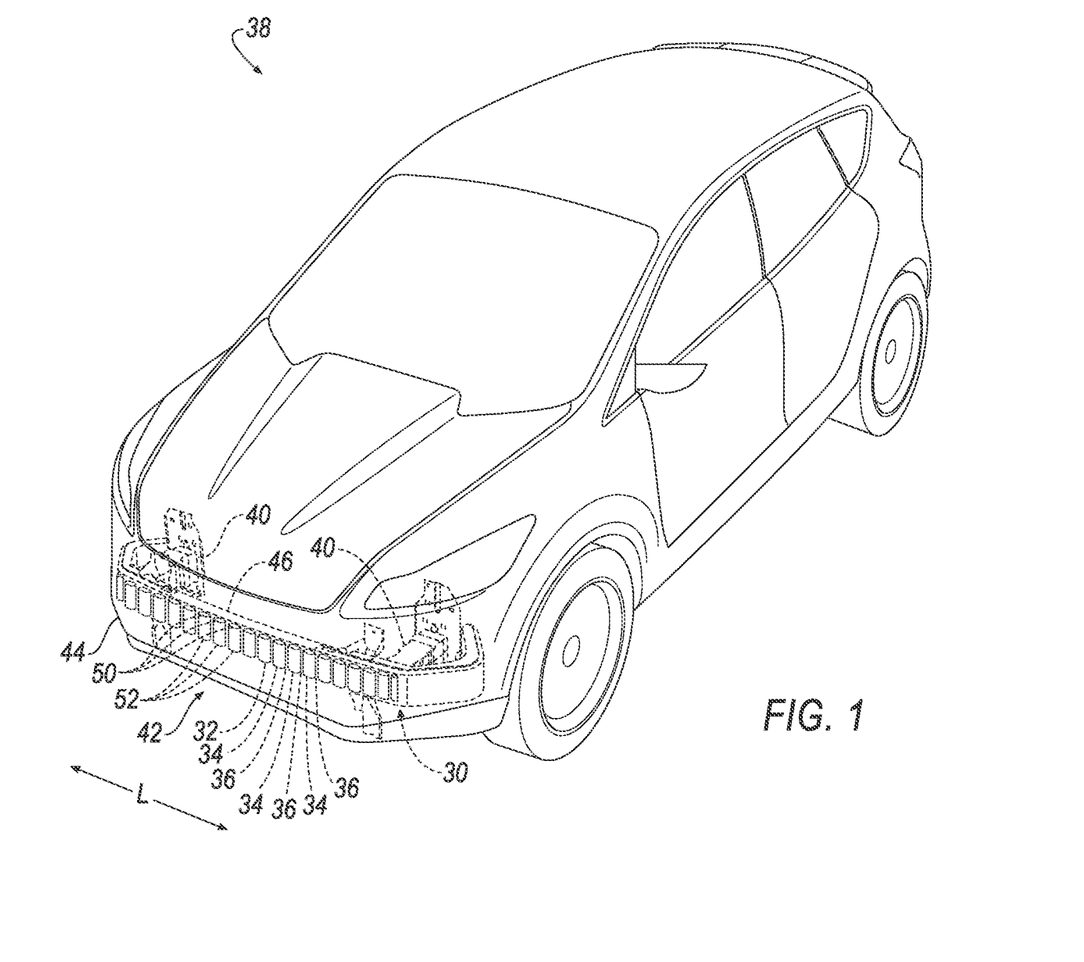
FIG. 1 is a perspective view of a vehicle.

With reference to FIG. 1, the vehicle 38 includes a frame 40, and the bumper assembly 42 is attached to the frame 40. The bumper assembly 42 may be disposed toward a front of the vehicle 38, as shown in FIG. 1, or toward a rear of the vehicle 38. The bumper assembly 42 may protrude from the vehicle 38 such that the bumper assembly 42 is the first component of the vehicle 38 impacted in a front or rear collision.

Figure 2:
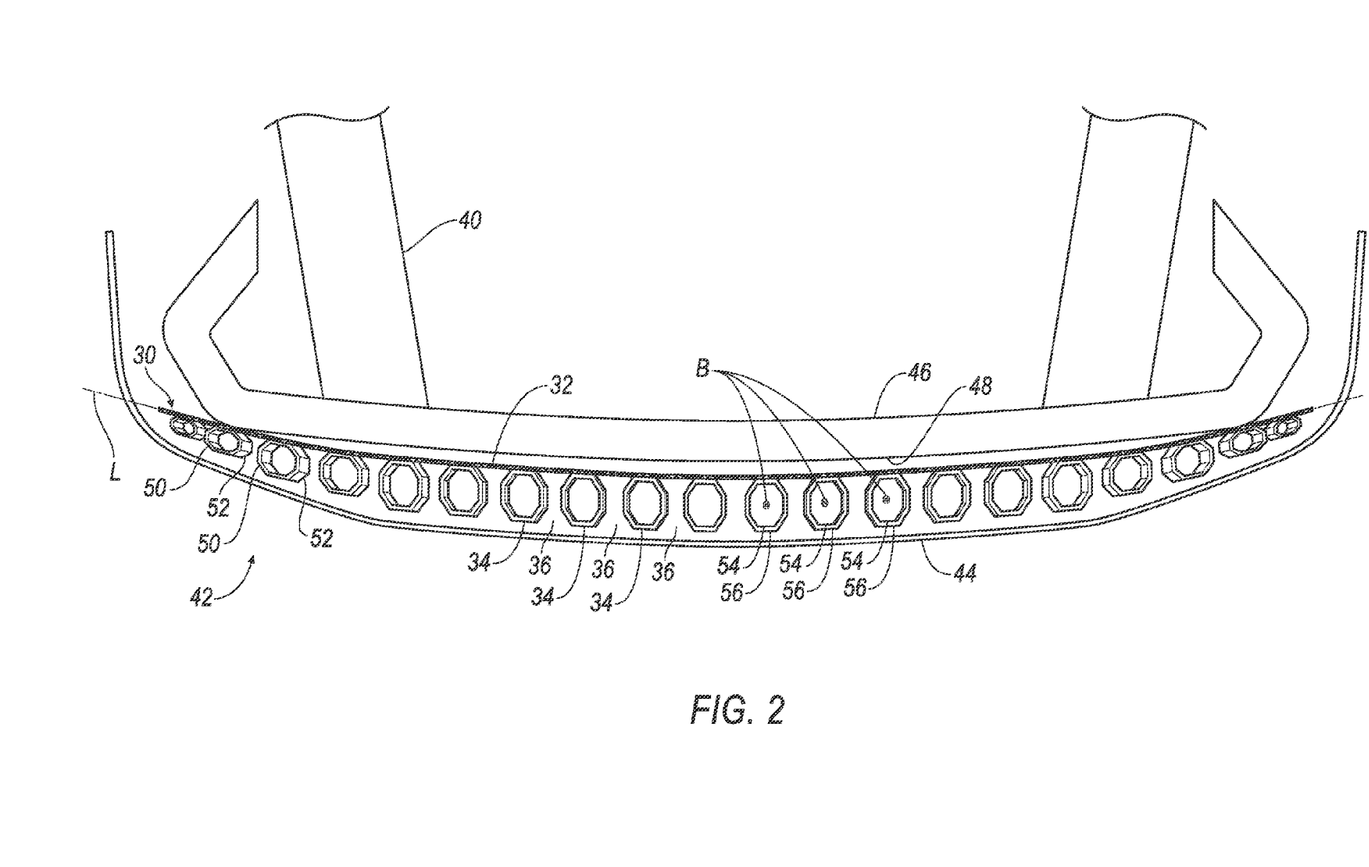
FIG. 2 is a top view of a bumper assembly of the vehicle including an energy-absorbing device.

With reference to FIGS. 2 and 5A, the bumper assembly 42 may include a bumper beam 46 fixed to the frame 40. The fascia 44 conceals the bumper beam 46 and the energy-absorbing device 30. The fascia 44 may present a class-A surface, i.e., a surface specifically manufactured to have a high-quality, finished aesthetic appearance free of blemishes. The fascia 44 may be supported by the frame 40 and/or body components of the vehicle 38.

The frame 40 may be of any suitable construction, e.g., unibody construction, body-on-frame construction, or of any other suitable construction. The frame 40 may be formed of any suitable material, for example, steel, aluminum, etc.

The bumper beam 46 extends longitudinally across a front or rear of the vehicle 38. The bumper beam 46 may have a vehicle-outward face 48, which for a front bumper assembly 42 faces the direction of the vehicle 38 when traveling forward and for a rear bumper assembly 42 faces the direction of the vehicle 38 when traveling in reverse. The bumper beam 46 may reinforce the structural integrity of the vehicle 38. The bumper beam 46 may be formed of any suitable material, for example, steel, aluminum, etc.

The energy-absorbing device 30 may be supported by at least one of the bumper beam 46 and the fascia 44 between the bumper beam 46 and the fascia 44. For example, as shown in FIG. 2, the energy-absorbing device 30 may be fixed to the bumper beam 46, e.g., the beam 32 may be fixed to the bumper beam 46. Alternatively or additionally, the beam 32 or the lobes 34, 134 may be supported by the fascia 44.

With reference to FIGS. 2 and 5A, the beam 32 of the energy-absorbing device 30 may be attached to the vehicle-outward face 48 of the bumper beam 46. The beam 32 may be flush with the bumper beam 46, or the beam 32 may be spaced from the bumper beam 46. Alternatively, the beam 32 may be identical to the bumper beam 46. The beam 32 has the longitudinal axis L. The longitudinal axis L may extend generally horizontally. The beam 32 may be formed of any suitable material, including plastic, such as injection-molded plastic; metal, such as aluminum or steel; or any other suitable material.

The lobes 34, 134 are attached to the beam 32. The lobes 34, 134 may be formed as separate components individually attached to the beam 32, such as the lobes 34 shown in the embodiment of FIGS. 1-4C, or may be connected to each other and attached to the beam 32 as a single component, such as the lobes 134 as shown in the embodiment of FIGS. 5A-C.

The lobes 34, 134 are positioned sequentially along the beam 32. In other words, the lobes 34, 134 are positioned along the beam 32 in a repeating pattern. Specifically, the repeating pattern includes alternating lobes 34, 134 and gaps 36. The lobes 34, 134 may vary in size and the gaps 36 may vary in size. The lobes 34, 134 may be arranged in, for example, a row. Alternatively, the lobes 34, 134 may be arranged in other patterns.

Each lobe 34, 134 may be spaced from the adjacent lobes 34, 134, and the gaps 36 separates the lobes 34, 134. As set forth above, the size and spacing of the lobes 34, 134 may vary along the beam 32. As also set forth above, adjacent ones of the lobes 34, 134 are configured to contact each other when both of the adjacent ones of the lobes 34, 134 are deformed. For example, the size and spacing of the lobes 34, 134 is such that if a single lobe 34 is deformed, the lobe 34, 134 does not contact adjacent lobes 34, 134, but if adjacent lobes 34, 134 are simultaneously deformed, the adjacent lobes 34, 134 will contact each other.

Figure 3A:
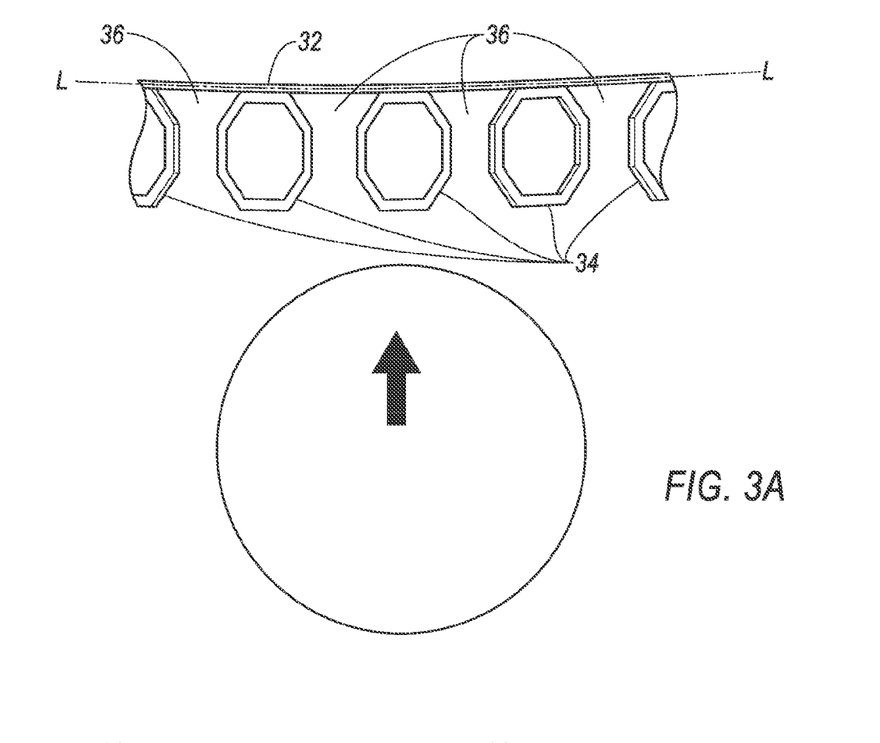
FIG. 3A is a top view of a portion of the energy-absorbing device before an impact with a relatively narrow object.
Figure 3B:
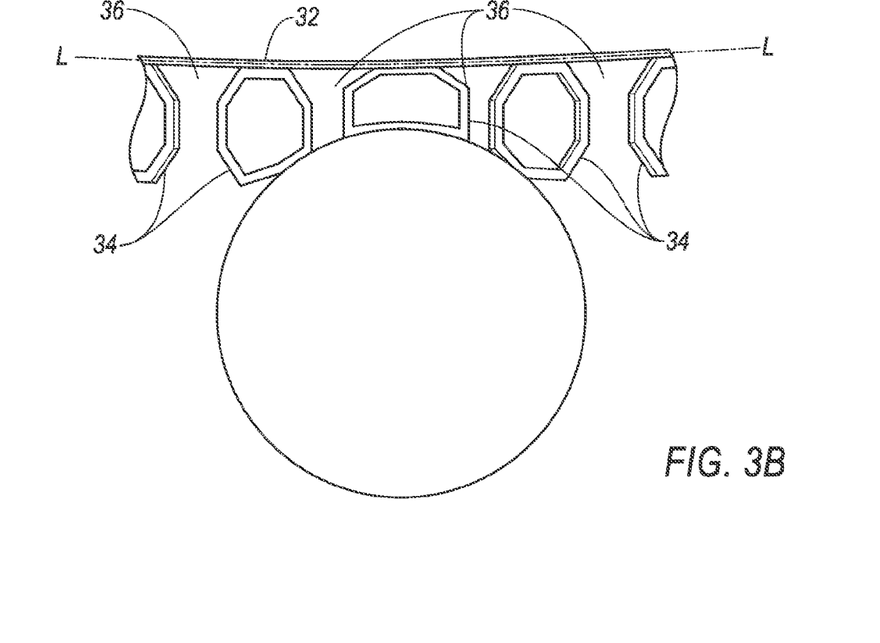
FIG. 3B is a top view of a portion of the energy-absorbing device after an impact with a relatively narrow object.
Figure 3C:
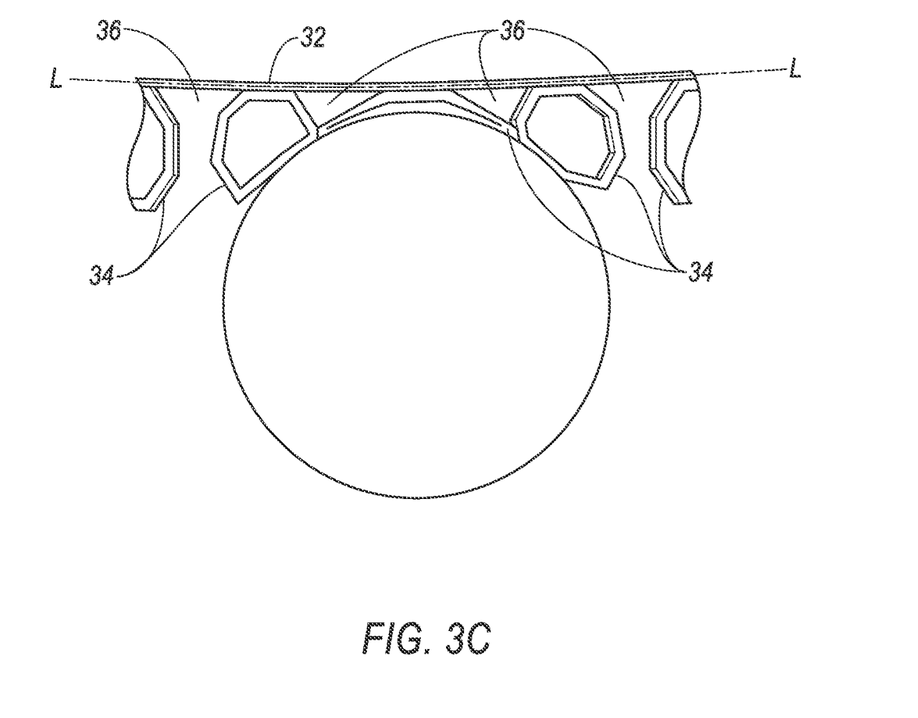
FIG. 3C is a top view of a portion of the energy-absorbing device further after an impact with a relatively narrow object than in FIG. 3B.
Figure 4A:
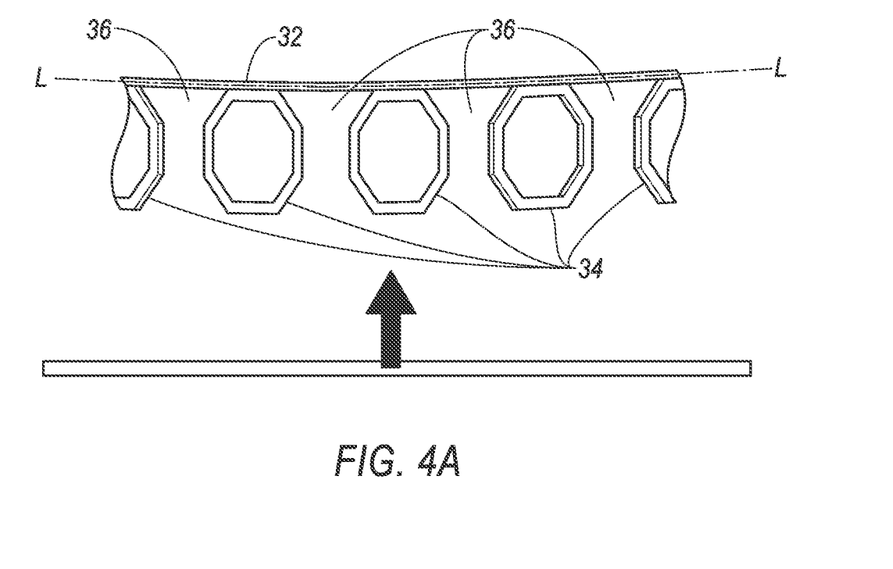
FIG. 4A is a top view of a portion of the energy-absorbing device before an impact with a relatively wide object.
Figure 4B:
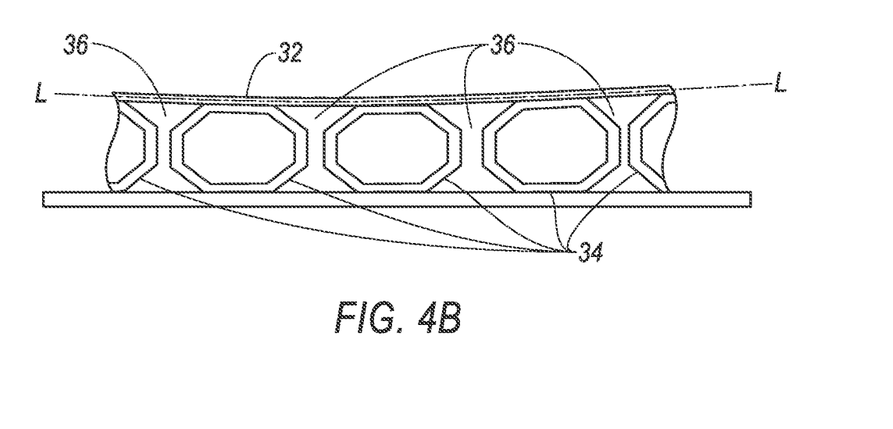
FIG. 4B is a top view of a portion of the energy-absorbing device during an impact with a relatively wide object.
Figure 4C:
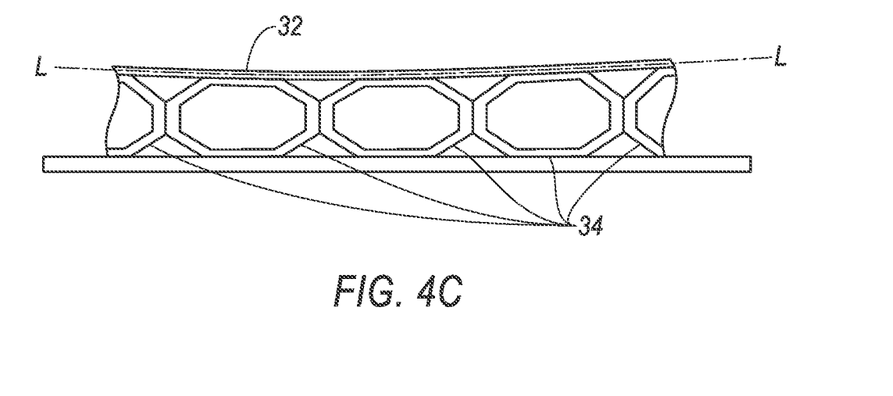
FIG. 4C is a top view of a portion of the energy-absorbing device after an impact with a relatively wide object.
Figure 5A:
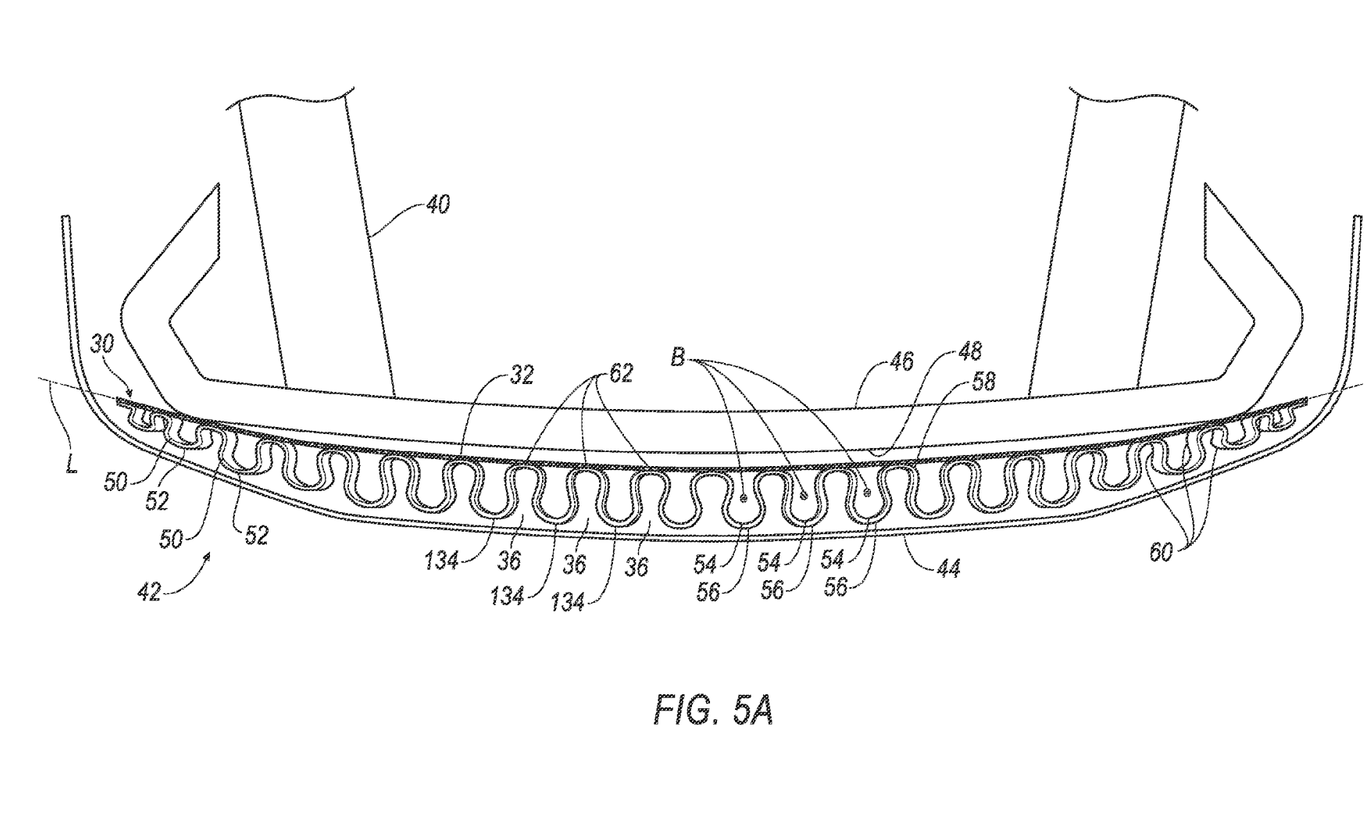
FIG. 5A is a top view of a bumper assembly of the vehicle including anther embodiment of the energy-absorbing device.
Figure 5B:
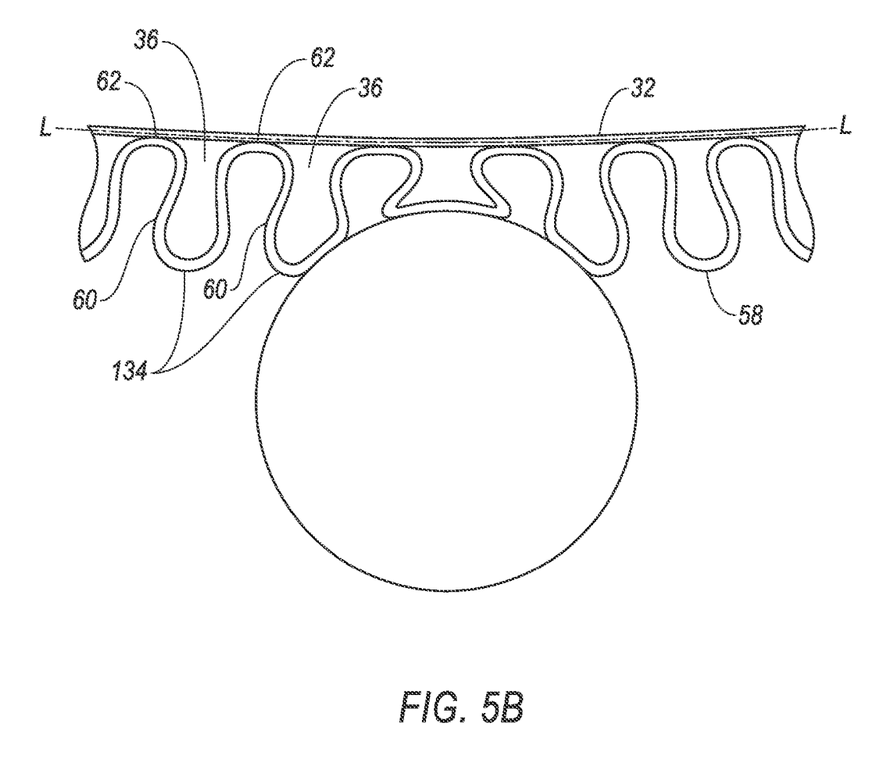
FIG. 5B is a top view of a portion of the energy-absorbing device of the embodiment of FIG. 5A during impact with a relatively narrow object.
Figure 5C:
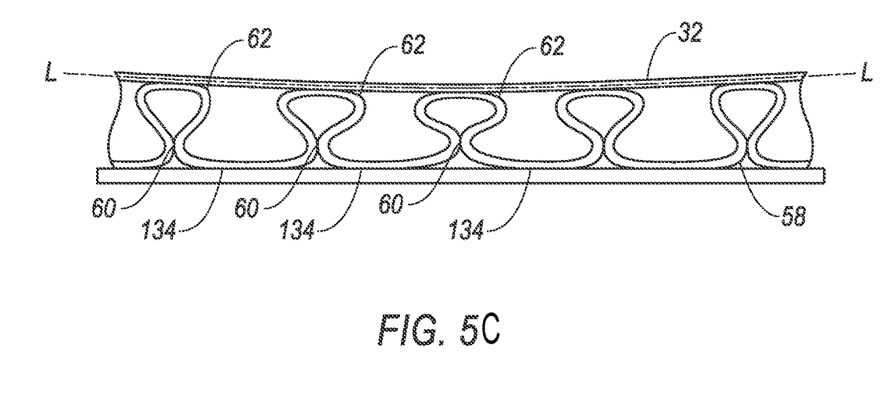
FIG. 5C is a top view of a portion of the energy-absorbing device of the embodiment of FIG. 5A during impact with a relatively wide object.

Specifically, each lobe 34, 134 is deformable from an initial position (shown in FIGS. 3A, 4A, and 5A) to a deformed position (shown in FIGS. 3B, 4C, and 5B-C). Adjacent ones of the lobes 34, 134 are spaced from each other when at least one of the adjacent ones of the lobes 34, 134 is in the initial position, as shown in FIGS. 3B and 5B. Adjacent ones of the lobes 34, 134 may contact each other when both of the adjacent ones of the lobes 34 are in the deformed position, as shown in FIGS. 4C and 5C. In other words, the lobes 34, 134 are configured to deform locally without cascading beyond immediately adjacent lobes 34, 134, and the lobes 34 are configured to contact adjacent lobes 34, 134 when deforming simultaneously with adjacent lobes 34, 134. Stated another way, each lobe of the plurality of lobes 34, 134 is configured to deform without contacting a first adjacent lobe 34, 134 when contacted only by a second adjacent lobe 34, 134, but when a series of lobes 34, 134 is impacted, the lobes 34, 134 contact adjacent lobes 34, 134.

Each lobe 34, 134 may have a uniform cross-section. The plurality of lobes 34, 134 may extend from the beam 32 transverse to the longitudinal axis L of the beam 32; in other words, the cross-sections of the lobes 34, 134 may face a direction transverse to the longitudinal axis L of the beam 32. Alternatively, the lobes 34, 134 may extend in different directions from one another.

The lobes 34, 134 are deformable relative to the beam 32 and/or relative to the bumper beam 46. The lobes 34, 134 may be formed of any suitable material, including plastic, such as injection-molded plastic; metal, such as aluminum or steel; or any other suitable material. The lobes 32 may be formed of the same type of material as the beam 32 or a different type of material than the beam 32.

The lobes 34, 134 may be formed separately from and subsequently attached to the beam 32 in any suitable manner. For example, the lobes 34, 134 may be attached to the beam 32 with welding, e.g., in embodiments in which the beam 32 and lobes 34, 134 are formed of steel; by brazing, e.g., in embodiments in which the beam 32 and lobe are formed of aluminum; by adhesive; or any other suitable attachment. Alternatively, the lobes 34, 134 may be integral with the beam 32, i.e., formed together simultaneously as a single, continuous unit. For example, the lobes 34, 134 and the beam 32 may be formed by injection molding, e.g., with plastic; extrusion, e.g., with plastic or aluminum; etc.

As one example, as shown in FIGS. 1-4C, the lobes 34 may be tubular. In this embodiment, the lobes 34 may be separate components from each other, i.e., connected only by the beam 32. When tubular, the lobes 34 may be aligned all in the same direction, as shown in FIGS. 1-4C, or may be arranged in different directions. The thicknesses of sides of the lobes 34 may be uniform among the lobes 34 or may vary.

Each lobe 34 may have a first end 50, a second end 52, a bore 54 extending through the first and second ends 50, 52, and a side 56 extending from the first end 50 to the second end 52 and surrounding the bore 54. (The adjectives "first" and "second" are used throughout this document as identifiers and are not intended to signify importance or order.) The side 56 of each lobe 34 may be fixed to the beam 32. The bores 54 may each have a bore axis B spaced from the longitudinal axis L of the beam 32. The bores axes B may be generally parallel to each other. The bore axes B may be generally vertical.

When tubular, the cross-section of each lobe 34 through the bore axis B has a perimeter p, that is, the distance around the outside of the cross-section. Each cross-section has a width w, that is, the distance from one side to the other in the longitudinal axis L. Each cross-section has a shape. For example, each lobe 34 may have a circular cross-sectional shape, a hexagonal cross-sectional shape, an octagonal cross-sectional shape, or any other suitable cross-sectional shape. A hexagonal or an octagonal shape, for example, may be a regular polygonal shape or may have sides of differing lengths. If the cross-sectional shape is a circle, for example, then the width w is the diameter of the circle, and the perimeter p is π multiplied by the diameter.

With reference to FIGS. 5A-C, the energy-absorbing device 30 includes a strip 58 fixed relative to the beam 32. The strip 58 has a plurality of corrugations 60. The corrugations 60 form bases 62 and the lobes 134. The bases 62 are attached to the beam 32.

The size of the corrugations 60 and the spacing between the lobes 134 may be uniform along the strip 58 or may vary along the strip 58. The corrugations 60 may be crimped into the strip 58, or the strip 58 may be initially formed with corrugations 60. The corrugations 60 may each have a corrugation axis C spaced from the longitudinal axis L, and the corrugation axes C may be generally parallel to each other.

With reference to FIGS. 3A-B and 5B, in the event that the bumper assembly 42 impacts a narrow object, for example, a leg of a pedestrian, first the fascia 44 will deform from impacting the object. Then one or two of the plurality of lobes 34, 134 will impact the object. The lobe or lobes 34, 134 will deform in response to the impact. The deformation of the lobe 34, 134 will absorb energy from the impact. The impacted lobes 34, 134 may contact adjacent lobes 34, 134, but the adjacent lobes 34, 134 will not contact additional lobes 34, 134. The lobes 34, 134 do not enter the second stage of energy absorption described below.

With reference to FIGS. 4A-C and 5C, in the event that the bumper assembly 42 impacts a relatively wide object, for example, another vehicle, first the fascia 44 will deform from impacting the object. Then multiple of the plurality of lobes 34, 134 will be impacted by the object. The lobes 34, 134 will deform in response to the impact. The deformation of the lobes 34, 134 will absorb energy from the impact. If the impact has sufficient energy, then the lobes 34, 134 will contact adjacent lobes 34, 134 during the deformation. The adjacent lobes 34, 134 reinforce one another, which stiffens the bumper assembly 42 and provides greater resistance relative to an impact with a narrow object. In other words, the lobes 34, 134 may provide two-stage energy absorption. Specifically, a first stage of energy absorption occurs when the lobes 34, 134 are individually deformed, i.e., before contacting each other. After the lobes 34, 134 are deformed enough to contact each other, a second stage of energy absorption occurs. The second stage of energy absorption is stiff relative to the first stage, i.e., more force is absorbed with less deformation of the lobes 34, 134 because the deformation of each lobe 34, 134 is limited by the adjacent lobes 34, 134.

If an impact sensor (not shown) is present on or coupled to the bumper beam 46, the impact sensor may detect the impact more quickly because the force of the impact is transferred through the lobes 34, 134 more quickly.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An energy-absorbing device comprising:
   a beam;
   a plurality of lobes attached to and positioned sequentially along the beam, wherein the lobes are tubular; and
   a gap between adjacent lobes, wherein each gap has a width that is greater than one fourth of a perimeter of each lobe adjacent the gap;
   wherein the lobes are spaced from each other and deformable relative to the beam, and wherein adjacent ones of the lobes are configured to contact each other when both adjacent ones of the lobes are deformed.

2. The energy-absorbing device of claim 1, wherein each lobe extends from the beam transverse to a longitudinal axis of the beam.

3. The energy-absorbing device of claim 1, wherein each lobe has a first end, a second end, a bore extending through the first and second ends, and a side extending from the first end to the second end and surrounding the bore, wherein the side of each lobe is fixed to the beam.

4. The energy-absorbing device of claim 3, wherein the bores each have a bore axis spaced from a longitudinal axis of the beam.

5. The energy-absorbing device of claim 4, wherein the bore axes are generally parallel to each other.

6. The energy-absorbing device of claim 4, wherein the bore axes are generally vertical, and the longitudinal axis of the beam is generally horizontal.

7. The energy-absorbing device of claim 1, wherein each lobe is deformable from an initial position to a deformed position, wherein adjacent ones of the lobes are spaced from each other when at least one of the adjacent ones of the lobes is in the initial position.

8. The energy-absorbing device of claim 7, wherein adjacent ones of the lobes contact each other when both of the adjacent ones of the lobes are in the deformed position.

9. The energy-absorbing device of claim 1, wherein each gap has a width that is less than one fourth the combined perimeters of the lobes adjacent the gap minus one half the combined widths of the lobes adjacent the gap in the longitudinal axis.

10. The energy-absorbing device of claim 1, wherein each lobe has an octagonal cross-sectional shape.

11. The energy-absorbing device of claim 1, further comprising a strip fixed relative to the beam, the strip having a plurality of corrugations forming the lobes.

12. The energy-absorbing device of claim 11, wherein the corrugations each have a corrugation axis spaced from a longitudinal axis of the beam, and the corrugation axes are generally parallel to each other.

13. A bumper assembly comprising:
    a bumper beam;
    a fascia spaced from the bumper beam; and
    an energy-absorbing device supported by at least one of the bumper beam and the fascia between the bumper beam and the fascia;
    the energy-absorbing device including a beam, a plurality of lobes attached to and positioned sequentially along the beam, and a gap between adjacent lobes, the lobes being tubular, each gap having a width that is greater than one fourth of a perimeter of each lobe adjacent the gap, the lobes being deformable relative to the beam, and adjacent ones of the lobes are configured to contact each other when both adjacent ones of the lobes are deformed.

14. The bumper assembly of claim 13, wherein the beam is connected to the bumper beam.

15. The bumper assembly of claim 13, wherein the lobes are spaced from each other along the beam.

16. The bumper assembly of claim 13, wherein each lobe extends from the beam transverse to a longitudinal axis of the beam.

17. The bumper assembly of claim 13, wherein each lobe of the plurality of lobes is configured to deform without contacting a first adjacent lobe when contacted only by a second adjacent lobe.

18. The bumper assembly of claim 17, wherein each lobe is deformable from an initial position to a deformed position, wherein adjacent ones of the lobes are spaced from each other when at least one of the adjacent ones of the lobes is in the initial position.

19. The bumper assembly of claim 13, wherein each gap has a width that is less than one fourth the combined perimeters of the lobes adjacent the gap minus one half the combined widths of the lobes adjacent the gap in the longitudinal axis.

* * * * *